April 5, 1927. 1,623,036
G. A. ANDERSON
TRUCK SIDE FRAME
Original Filed Oct. 17, 1922    3 Sheets-Sheet 1
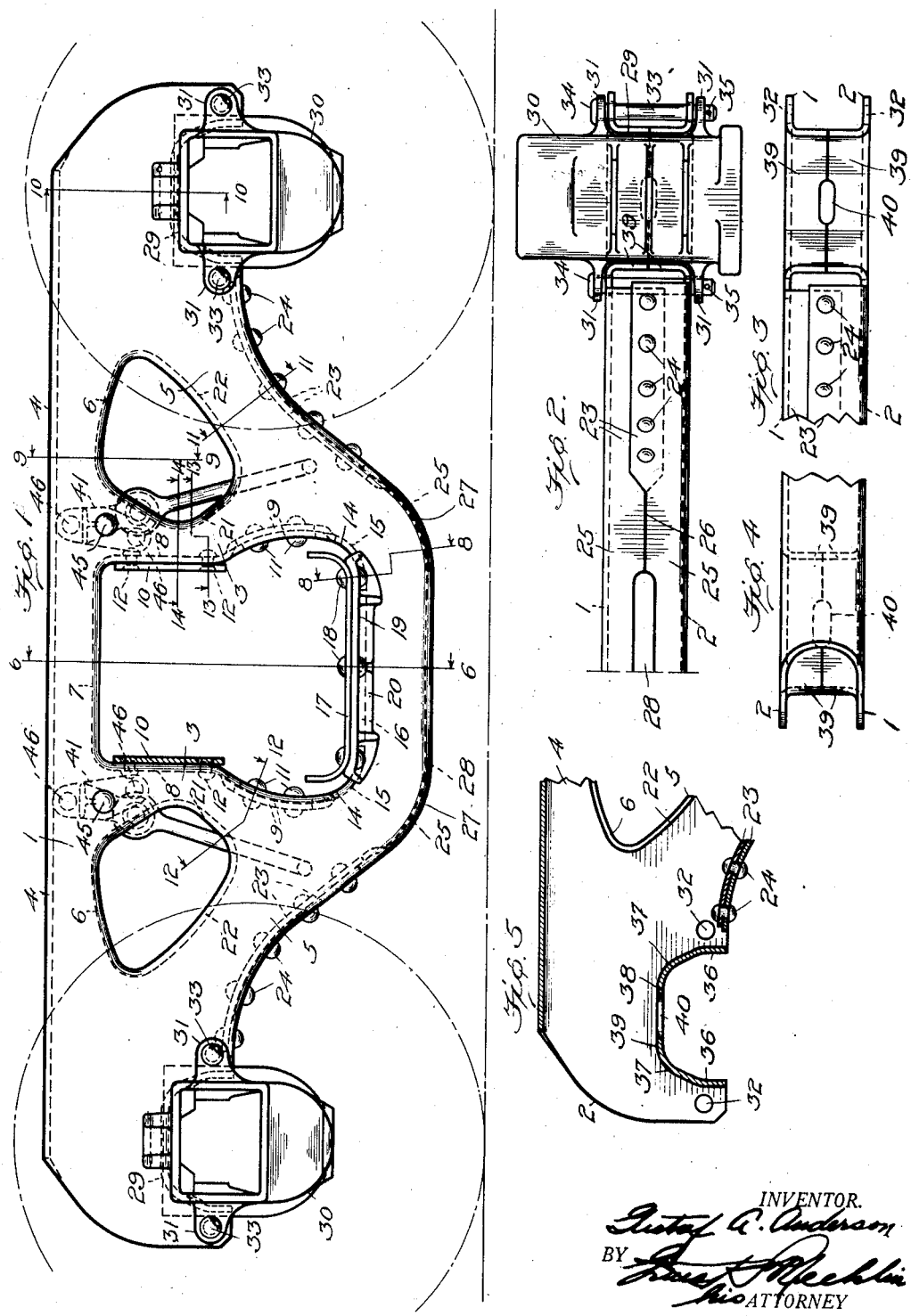
INVENTOR.
Gustaf A. Anderson
BY
ATTORNEY April 5, 1927.
G. A. ANDERSON
1,623,036
TRUCK SIDE FRAME
Original Filed Oct. 17, 1922    3 Sheets-Sheet 2
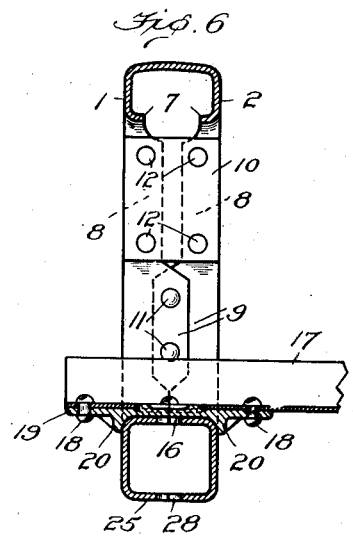
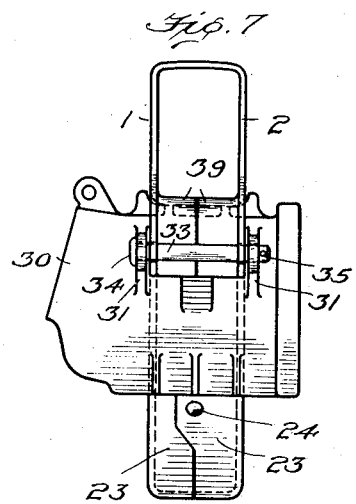
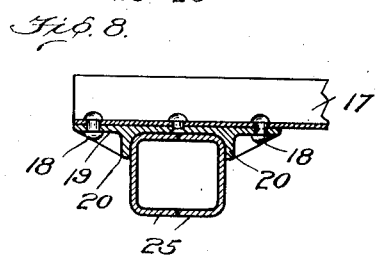
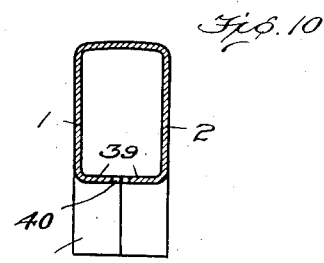
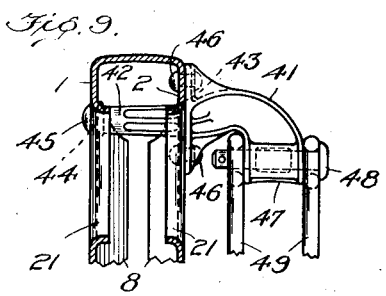
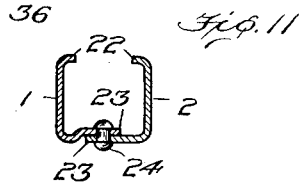
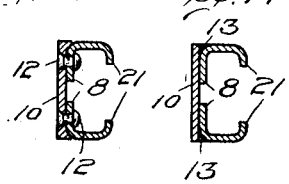
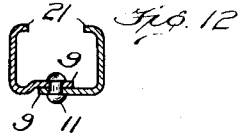
INVENTOR.
Gustaf A. Anderson
BY
his ATTORNEY April 5, 1927.
G. A. ANDERSON
1,623,036
TRUCK SIDE FRAME
Original Filed Oct. 17, 1922    3 Sheets-Sheet 3
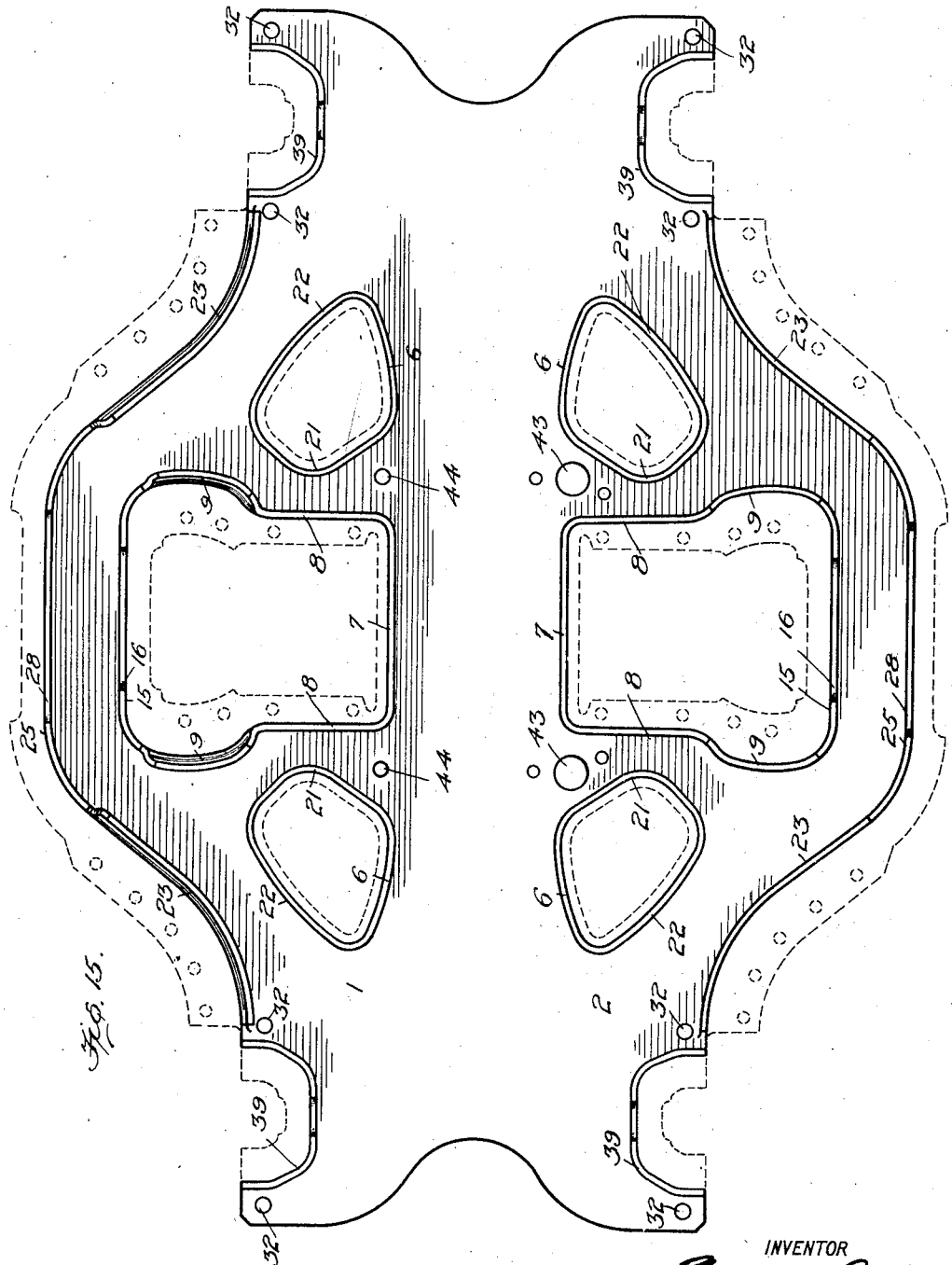

Patented Apr. 5, 1927.

1,623,036

UNITED STATES PATENT OFFICE.

GUSTAF A. ANDERSON, OF BALTIMORE, MARYLAND, ASSIGNOR, BY MESNE ASSIGNMENTS, TO THE SYMINGTON COMPANY, A CORPORATION OF MARYLAND.

TRUCK SIDE FRAME.

Application filed October 17, 1922, Serial No. 595,099. Renewed February 7, 1927.

My invention relates to side frames for car truck and has been primarily designed to provide a construction which is both strong and stiff but comparatively light in weight, and in which costs incident to manufacture and maintenance are reduced to a minimum, my present construction of side frame being particularly adapted to types of journal boxes in which tie bars are omitted.

The invention, generally stated, resides in forming a car truck side frame from a sheet or blank of metal folded to provide an inner wall and an outer wall arranged in spaced relation, each of said walls having a plurality of truck column portions, a plurality of top arch bar portions, and a plurality of bottom arch bar portions.

One of the principal features of the invention, particularly stated, involves the production of a car truck side frame from a sheet of wrought metal shaped to form inner and outer spaced side walls provided at their respective ends with portions designed to contact the journal boxes and provide strong and effective connecting means, said means acting in the nature of bearing supports for effectively resisting strains incident to service conditions.

Another object of the invention is to provide a pressed metal car truck side frame in which the bottom arch bar portions adjacent the side walls at each end of the side frame are provided with inwardly projecting flanges shaped to conform to the contour of a portion of the journal box, thereby producing a simple construction of tie means for the journal boxes in which the usual tie bars are omitted. The provision of a strong and rigid side frame from a blank or sheet of metal from which tie bar portions are omitted, reduces the cost incident to the quantity of material used and also minimizes the amount of labor required to produce the finished side frame.

A further object of the invention is to provide a side frame with recesses near the ends thereof, each of said recesses being formed with inwardly and upwardly converging wall portions adapted to engage the upper portion of the journal box, the inward convergence of the outermost wall portion of the recess providing an increased cross sectional area of metal between the extreme end of the side frame and said outermost wall portion of the recess, said increased cross sectional area serving to materially increase the strength of the side frame adjacent the journal box and minimize the possibility of failure of the frame at these points. A considerable saving of material is also effected through the inward convergence of the outermost walls of said recesses, in that the blank from which the side frame is produced can be cut shorter without decreasing the effective strength value of the metal at points adjacent the journal boxes. In addition, the inward and upward convergence of the side walls of the journal box recesses provides for the advantageous manufacture of the journal boxes in that the parting of the mold required in producing said journal boxes can be effected on a line which would pass through the walls of the recesses at or about the beginning of the upward and inward convergence thereof.

A still further object of the invention is to provide a car truck side frame from a folded blank or sheet of wrought metal, said side frame including spaced side walls having inwardly extending stiffening flanges, portions of said flanges being overlapped and connected by rivets throughout said overlapped portions, and other portions of said flanges adjacent said riveted overlapped portions being abutted and welded, said welded portions being preferably provided at the bends adjacent the truck column portions and bottom arch bar portions, respectively, to provide clearance between the bottom of the side frame and the rail heads, and also to permit the introduction of the spring plank and saddle casting therefor.

The invention has for a further object the provision of a car truck side frame formed from a metal blank folded on an axis of symmetry passing through the side frame so as to provide spaced side walls, each of said walls having truck column portions, top arch bar portions, and bottom arch bar portions, said truck column portions and bottom arch bar portions having their lower ends, which extend around the corner bends at the bottom of the bolster opening, formed by a compound curved construction, said construction permitting the use of a maximum quantity of metal at said bends and materially reducing failures of the side frame at these points, The invention further consists in the method of manufacturing a car truck side frame by forming the same from a continuous sheet metal blank having corresponding side frame portions which are symmetrically disposed with respect to an axis of symmetry passing between them, bending portions of said blank to form flanges overlapping and uniting portions of said flanges throughout their overlapped length, abutting and welding other portions of said flanges, cutting opposite ends of said blank to form journal box recesses, bending portions adjacent said recesses to form flanges, and uniting said last named flanges to provide journal box openings at each end of the side frame. My improved method of manufacturing car truck side frames also contemplates the formation of inwardly extending stiffening flanges bent to provide a compound curved construction adjacent the truck column portions and bottom arch bar portions of the side frame.

There are other features of the invention pertaining to the particular combination of parts and details of construction, all as will hereinafter appear.

In the drawings illustrating the invention, the scope whereof is pointed out in the claims:

Figure 1 is a view in side elevation of a car truck side frame embodying the invention and disclosing in combination therewith my improved construction of journal boxes, the wheels of the car truck being shown diagrammatically in dotted lines.

Figure 2 is a detail bottom plan view of a portion of the side frame and associated journal box connected thereto.

Figure 3 is a detail bottom plan view of the end of the side frame showing the journal box removed.

Figure 4 is a detail top plan view of one end of the side frame with the journal box removed.

Figure 5 is a detail vertical longitudinal section of an end portion of the side frame, the journal box being removed.

Figure 6 is a vertical transverse sectional view on the line 6—6 of Figure 1.

Figure 7 is an end view of my improved side frame and associated journal box.

Figure 8 is a detail vertical cross sectional view on the line 8—8 of Figure 1.

Figure 9 is a similar view on the line 9—9 of Figure 1 illustrating in elevation the brake hanger bracket and a portion of the hanger.

Figure 10 is a detail vertical cross sectional view on the line 10—10 of Figure 1 with the journal box removed.

Figure 11 is a detail cross sectional view on the line 11—11 of Figure 1.

Figure 12 is a similar view on the line 12—12 of Figure 1.

Figures 13 and 14 are horizontal detail sectional views on the lines 13—13 and 14—14, respectively, of Figure 1.

Figure 15 is a view illustrating a sheet metal blank for forming the side frame.

Referring to the drawing, in which corresponding reference characters designate similar parts in the several views, my improved side frame includes an outer wall 1 and an inner wall 2 formed from a continuous sheet or blank of metal folded at the top along a line parallel with respect to an axis of symmetry of said blank. The walls are arranged in spaced relation and each comprises truck column portions 3, top arch bar or compression portions 4 and bottom arch bar or tension portions 5. The blank is preferably folded at the top of the side frame on a straight line which is parallel to an axis of symmetry passing between symmetrical side frame portions, said portions being provided with inwardly extending stiffening flanges, all of which are bent from one side of the blank, as best shown in Figure 15. The dotted lines in said figure indicate the contour of the blank, as originally cut.

The top of the side frame is preferably slightly crowned, as shown, the lower edges of the top arch bar portions of the side frame being provided with inwardly extending flanges 6, the said lower edges being downwardly inclined from the truck column portions to produce in effect a cambered compression member. Inwardly projecting stiffening flanges 7 are also provided on the lower edges of the top arch bar portions between the truck column portions, said flanges being continued around the upper corner bends adjacent the truck columns and merging into relatively wider flanges 8 at the upper portion of the truck columns.

The truck column portions 3 are also provided with inwardly extending flanges 9, said flanges 9 being formed at the lower portions of the truck columns and designed to be overlapped, as clearly shown in Figure 6. The flanges 9 form continuations of the upper adjacent flanges 8. The overlapped portions of the flanges 9 are riveted together between the lower corner bends uniting the truck column portions with the spring plank seat portions and the bolster chafing plates 10. Rivets 11 firmly unite the overflapped portions of the flanges 9 one of said flanges extending inwardly of the adjacent truck column portion and the other of said flanges being offset to overlie the adjacent flange, as best shown in Figure 12. The bolster chafing plates 10 serve to firmly unite the flanges 8, rivets 12 having countersunk heads serving to effect this connection. In addition, portions of the edges of the chafing plates may be welded, as indicated at 13 in Figure 14.

The lower portions of the truck columns of the side frames are vertically offset with respect to the upper portions of the truck columns to provide an enlargement of the bolster opening adjacent the spring plank, as clearly shown in Figure 1. The truck column portions at their lower ends and the adjacent inwardly extending flanges 9 are preferably curved, as shown, the lower ends of said curved portions continuing around the corner bends uniting the truck column portions with the spring plank seat portions in compound curves 14 at each side of the spring plank, thereby providing an increased cross sectional area and corresponding strong corner bend. The lower portions of the bolster or window opening are, as a result of this construction, defined by opposing curves, which merge into the curves at the lower corners of the window opening, as distinguished from relatively parallel side portions of the lower ends of the truck columns. The effect of this curving or bulging out of the lower portions of the truck columns is to give greater easement to the adjacent flanging and to also provide for rivet clearance. The corner bends formed by the compound curves include inwardly extending flanges 15 which are continuations of the overlapped flanges 9, said flanges 15 being preferably abutted and welded around the corner bends adjacent the overlapped and riveted flanges 9. The flanges 15 are preferably continued across the spring plank seat portion of the side frame, said flanges being spaced apart intermediate the corner welds to form the opening 16.

The spring plank 17 of the truck is preferably rigidly secured by means of rivets 18 to a saddle casting or seat member 19 which rests upon the side frame at the lower end of the bolster opening, said saddle casting being preferably formed with downwardly projecting portions 20 which embrace adjacent portions of the side frame and thus serve to resist any spreading or separation of the walls of the side frame at this point.

The rear or outer edges of the truck column portions are preferably provided with inwardly extending stiffening flanges 21, said flanges conforming to the angular disposition of said rear edges of the truck column portions, as best shown in Figure 1. The flanges 21 unite with the inwardly extending flanges 6 provided on the lower edges of the top arch bar portions, said flanges 21 also uniting with adjacent continuing flanges 22 extending inwardly and provided along the upper edges of the bottom arch bar portions. The flanges 21, 6 and 22 surround the irregularly shaped openings or windows in the side frame, thereby adding rigidity to the side frame adjacent the corresponding side frame portions, and permitting the omission of considerable metal from the blank without impairing its strength value.

The bottom arch bar portions 5 are each provided with an inwardly extending stiffening flange 23, the respective edges of the flanges being overlapped and united by means of rivets 24. The overlapped flanges of the bottom arch bar portions are riveted throughout their length, said overlapping preferably extending from or adjacent the truck column portions to the journal boxes, as best shown in Figure 1. One of the flanges 23 is preferably offset with respect to its adjacent overlapped flange to provide substantially a flush bottom face for the bottom arch bar portions of the side frame.

The riveted portions of the flanges 23 preferably extend across the center line of the frame and the abutting portions of the flanges meet on said center or mid line. The portions of the flanges designated as 25 are continuous along the bottom arch bar portions or tension member and the horizontal portion beneath the window opening. The flanges of the tension member of the side frame are preferably abutted and welded at the bottom or horizontal portions thereof and are overlapped and riveted along the diagonal portions of said tension members.

The flanges 23 are each cut from the blank so as to terminate short of the flanges forming the inner abutment walls of the journal box recesses, thereby providing an interruption in the otherwise continuous flange which extends along the lateral marginal edges of the plate. These interruptions prevent the stretching of the metal of the flanges 23 during the formation of the flanges surrounding the journal box recesses which is a great benefit in the manufacture of the frame. By locating the interrupted portion of the flanges 23 adjacent the journal box seat portions, the bending of the flanges surrounding the said seat portions is facilitated and the frame is not weakened since at the points where the flanges 23 are interrupted the frame has its greatest cross-sectional area.

The bottom arch bar portions at the corner bends uniting said arch bar portions with the truck column portions are provided with inwardly extending flanges 25, said flanges being abutted and welded around said corner bends, as indicated by the numeral 26 in Figure 2. The flanges 25 are formed from a construction designed about a compound curve indicated by the numeral 27 at the lower corner bend uniting the bottom arch bar portions with the lower portions of the truck columns, thereby providing increased cross sectional area of metal at these points which, in conjunction with the corner bend formed by the compound curved portions 14, produces an advantageous construction for the insertion of the bolster and reduces failures of the side frame at or about these points to a maximum. The flanges 25 are preferably continued across the bottom of the side frame beneath the bolster opening, said flanges being spaced apart to form the opening 28 intermediate the truck columns, as shown in Figure 2. The welding of the abutted flanges 25 preferably extends beneath the bolster opening, the said welding terminating immediately adjacent the overlapped and longitudinally riveted flanges 23. A strong and continuous connection is provided at the bottom of the side frame, as a result of the foregoing construction, the same acting to materially reinforce the frame against strains imparted through the journal boxes mounted in the recessed portions at the respective ends of the side frame. It will be noted that the contour of the lower edge of the frame, or tension member 5 thereof, is convex downwardly beneath the bolster guide columns, gradually changing to concave downwardly as it continues toward the ends of the frame.

Journal box recesses 29 are adapted to receive the journal boxes 30, the upper portions of said journal boxes extending well into the said recesses. Each journal box is provided with oppositely extending longitudinally arranged lugs 31 adjacent the respective side walls 1 and 2 of the side frame, each of said lugs 31 being provided with an opening. Openings 32 are provided in the walls of the side frame, said openings 32 registering with the openings provided in the lugs 31 and being arranged to receive the connecting pins 33. Each pin 33 is provided with a head 34, the opposite end of said pin being suitably perforated to receive a cotter pin 35. The pins 33 are preferably designed to extend loosely through the openings 32 in the side walls of the side frame. The pins may also be loosely mounted in the openings provided in the lugs 31 projecting from the journal box, said lugs being also preferably spaced from the side walls to provide lateral clearance, as will be understood.

The journal box recesses are each provided with side or end abutment walls 36, each of said walls having an inwardly and upwardly converging portion 37, the said converging portions being united by the top wall 38. The wall portions of the recesses are formed from inwardly projecting flanges 39 which extend from the side walls 1 and 2 of the side frame, the said flanges 39 being preferably united centrally of the spaced side walls, as best shown in Figures 3 and 4. The flanges 39 are formed by bending the same from one side of the blank, as will be understood from an inspection of Figure 15.

The foregoing construction of journal box bearing or jaw opening, as will be readily perceived, is not limited to pressed-metal side frames as the same may advantageously be utilized in other types of either pressed or cast steel side frames.

The walls lining the journal box recesses are adapted to engage the upper portion of the journal boxes 30, said walls providing a bearing support and connection for the journal boxes. The side or end walls of the recesses serve as abutments against which the walls of the journal box bear in resisting strains to which the side frame is subject under service conditions. The overlapped and riveted flanges terminate relatively close to the innermost walls 36 thereby providing reinforcing means adjacent the innermost abutments. The abutted edges of the flanges 39 which form the respective walls of the journal box recesses, are preferably united by welding, a suitable opening 40 being provided in the top wall, as shown.

The inwardly and upwardly converging portions of the journal box recess walls 36 provide for an increased cross sectional area of the metal between the outermost walls and the extreme ends of the side frame, said increased cross sectional area serving to advantageously strengthen the side frame at these points. In addition, it will be noted that the inward convergence of the outermost walls 36 permit the use of a relatively shorter sheet metal blank from which the side frame is formed, than would be required if said walls 36 were maintained in substantially vertical planes throughout their height. The inward and upward convergence of the walls 36 also permits the use of a particular type of journal box in which the top portion thereof can be effectively designed to conform to the contour of the journal box recesses, thereby permitting the parting of the mold used in the manufacture of the journal boxes on a line which will pass through the center of the journal box lugs 31 and portions of the respective side walls 36 at the beginning of their upward and inward convergence. This relation of journal boxes of a special type and corresponding side frame journal box recesses permits of a highly advantageous construction in which economy and rapidity of production are achieved.

Connected to the inner walls of the side frame are brake hanger brackets 41, each of said brackets being provided with a projection 42 adapted to extend through an opening 43 in said side wall, the outer end of said projection being preferably reduced to project through an opening 44 in the opposite side wall and adapted to be riveted over, as indicated by the numeral 45 in Figure 9. The brake hanger brackets are provided with oppositely extending flanges, each of which is connected to the inner side wall by means of rivets 46. Each brake hanger bracket is provided with a supporting head or boss 47 suitably perforated to receive the pin 48 which supports the spaced arms of the brake hanger 49. The reduced end of the projection 42 of the brake hanger bracket is preferably of soft metal to permit its being riveted against the outer face of the outer side wall, as shown. This construction may be obtained by inserting the soft metal portion into the mold when casting the bracket.

In providing a construction of truck side frame of the class described, it is highly desirable to provide an increased cross sectional area of metal at the junctions of the truck column portions and bottom arch bar portions, these being at least some of the critical points of the frame at which failures are most likely to occur. To accomplish this the corner bends uniting the truck column portions and spring plank seat portion bordering the bolster opening, and the corner bends uniting the lower edges of the bottom arch bar portions and the lower edges of the side frame walls extending beneath the bolster opening, are formed by producing said corner bends from radii whose centers are non-coincident, simple curves being struck from the suitably spaced centers to provide a varying cross sectional area of metal which is greatest at the points in the side frame to which the greatest strains are imparted.

The centers of the radii used to construct the respective curves at these corner bends are arranged in spaced relation so as to provide the greatest cross sectional area near or at the upper portions of the points of juncture. Various locations of the centers may be had when laying out and cutting the blank, said centers being arranged to produce eccentric arcs or curves as distinguished from the concentric arcs or curves, thereby providing cross sectional areas of maximum strength value at the critical points of the side frame.

My improved method of manufacturing car truck side frames consists in forming a continuous sheet metal blank having corresponding side frame portions which are symmetrically disposed with respect to an axis of symmetry of the blank passing between them, bending portions of said blank to form flanges, some of said flanges being associated at each end of the side frame to produce journal box recesses, and other of said flanges being overlapped and united adjacent at least one wall of said journal box recesses, and finally welding still other portions of said flanges adjacent said riveted overlapped flanges.

It will be noted that the top wall of the journal box opening is formed by cutting away portions of the outer edges of the sheet-metal blank, as will be understood by reference to Figure 15 of the drawings. The journal box recess flanges bent from each side wall of the side frame are continuous along the top and side or abutment wall portions of said recess. It will be noted that the ends of the side frame are not flanged, thereby providing a blank of metal of minimum size and correspondingly less cost. The flanging of the side frame walls to form the journal box openings provides sufficient strength in the ends of the side frame.

The method of manufacturing my improved car truck side frame also consists in shaping a continuous sheet metal blank having corresponding side frame portions which are symmetrically disposed with respect to an axis of symmetry of the blank passing between them, bending portions of said blank from one side thereof to form flanges, portions of said flanges being gradually deflected from a straight line to form compound curves, folding the blank along a line at the top of the side frame parallel to the said axis of symmetry of the blank, and finally uniting said flanges. It will further be noted that my improved method involves the production of a pressed metal car truck side frame in which the corner bends uniting the lower portions of the truck columns and the spring plank seat portions, together with the corner bends at the junctions of the bottom arch bar portions and said truck column portions, are struck from the blank on compound curves thereby providing a strong, durable and advantageous construction in which the greatest cross sectional area of the metal is utilized.

I claim:

1. A car truck side frame involving a continuous sheet metal blank shaped to form spaced inner and outer side walls, each of said walls having inwardly projecting flanges forming bearing portions adapted to partially enclose portions of the journal box.

2. A car truck side frame involving a continuous sheet metal blank shaped to form spaced inner and outer side walls, each of said walls being provided with inwardly extending portions at each end of the side frame, said inwardly extending portions being cooperatively associated adjacent one another to form recesses adapted to receive the journal box.

3. A car truck side frame involving a continuous sheet metal plank shaped to form spaced inner and outer side walls, each of said walls being formed with inwardly projecting flanges adapted to be joined longitudinally of the side frame to form journal box recesses at each end thereof.

4. A pressed metal car truck side frame including spaced inner and outer side walls, each of said side walls having inwardly and upwardly converging wall portions at each end of the side frame adapted to engage the journal box.

5. A pressed metal car truck side frame including spaced inner and outer side walls, each of said side walls having inwardly projecting flanges having their inner edges abutted intermediate the side walls to form spaced abutment walls adapted to engage opposite sides of the journal box.

6. A pressed metal car truck side frame including spaced inner and outer side walls, each of said side walls having flanges bent to form converging abutment walls adapted to engage the upper portions of the journal box.

7. A pressed metal car truck side frame including spaced inner and outer side walls, each of said side walls having portions bent inwardly thereof near each end of the side frame to form spaced wall portions adapted to contact a relatively large portion of the journal box.

8. A pressed metal car truck side frame including spaced inner and outer side walls, each of said side walls having portions bent therefrom to partially enclose a portion of the journal box and form a bearing member therefor.

9. A pressed metal car truck side frame including spaced inner and outer side walls, each of said side walls being formed with recesses adapted to receive a journal box, said recesses each having spaced end walls forming longitudinal abutments contacting opposite sides of the journal box.

10. A pressed metal car truck side frame including spaced inner and outer side walls, each of said side walls being formed with spaced portions having adjacent straight and inwardly converging faces adapted to engage opposite sides of a journal box and form abutments therefor.

11. A pressed metal car truck side frame including spaced inner and outer side walls, said side walls being provided at each end of the side frame with recesses having adjacent flanged portions united intermediate the side walls and adapted to contact the journal boxes.

12. A pressed metal car truck side frame including spaced inner and outer side walls, said side walls being provided at each end of the side frame with jaw portions partially enclosing the journal boxes, said portions being abutted intermediate the side walls at the respective ends of the side frame.

13. In combination, a car truck side frame having inner and outer side walls arranged in spaced relation, each of said walls being provided with portions forming transverse recesses at each end of the side frame, and journal boxes fitted within said recesses and having portions connected to said inner and outer side walls.

14. In combination, a car truck side frame having inner and outer side walls arranged in spaced relation, each of said walls being formed with portions forming recesses spaced from the extreme ends of said side frame, and journal boxes having longitudinally disposed portions connected to the outer faces of said side walls upon each side of said recesses.

15. In combination, a car truck side frame having inner and outer side walls arranged in spaced relation, each of said side walls being formed with transversely extending flanges bent to form recesses at each end of the side frame, journal boxes having portions extending into said recesses, and means connecting said journal boxes to said inner and outer side walls.

16. In combination, a car truck side frame having inner and outer side walls arranged in spaced relation, each of said walls being formed with inwardly projecting flanges united to form recesses at each end of the side frame, and journal boxes arranged within said recesses.

17. In combination, a car truck side frame having inner and outer side walls arranged in spaced relation, each of said walls being provided with flanges adapted to form longitudinally spaced abutments at each end of the side frame, journal boxes having portions contacting said abutments, and means loosely connecting said journal boxes to the inner and outer side walls.

18. In combination, a car truck side frame having inner and outer side walls arranged in spaced relation, each of said walls being provided with jaw portions bent therefrom to form bearing surfaces at each end of the side frame, and journal boxes having portions adapted to seat within and contact said bearing surfaces.

19. A pressed metal car truck side frame involving inner and outer side walls arranged in spaced relation, each of said walls having portions bent therefrom to form bearing surfaces adapted to engage and contact journal boxes, the cross sectional area of the metal between the uppermost portion of the bearing surfaces and the ends of the side walls, respectively, being greater than that at the lowermost portions of said bearing surfaces.

20. A pressed metal car truck side frame involving inner and outer side walls arranged in spaced relation, each of said side walls having flanges adapted to provide spaced end walls at the respective ends of the side frame for engaging the journal box, the outermost end walls being spaced at their upper portions greater distances from the respective ends of the side frame than at their lower portions to provide an increased cross sectional area adjacent the upper portions of the outermost end walls contacting the journal boxes.

21. A pressed metal car truck side frame involving inner and outer side walls arranged in spaced relation, each of said side walls having portions providing spaced abutment walls adapted to engage and contact relatively large portions of the respective journal boxes, a greater cross sectional area of metal being provided in said side walls between the ends thereof and the outermost abutment walls at the top portions thereof than at the bottom portions of said abutment walls.

22. A car truck side frame involving a sheet metal blank shaped to form inner and outer side walls arranged in spaced relation, each of said walls having a plurality of truck column portions, a plurality of top arch bar portions, a plurality of bottom arch bar portions, and a plurality of journal box recess portions; said recess portions including flanges bent to form spaced abutment walls adapted to engage the journal boxes, and inwardly extending flanges provided on said bottom arch bar portions, said flanges being firmly united adjacent the abutment walls of the journal box recess portions to provide reinforcing means for said abutment walls.

23. A car truck side frame involving a sheet metal blank shaped to form inner and outer side walls arranged in spaced relation, each of said walls having a plurality of truck column portions, a plurality of top arch bar portions, a plurality of bottom arch bar portions, and a plurality of journal box recess portions, said recess portions forming spaced abutment walls adapted to engage opposite sides of the journal boxes, and means including inwardly projecting flanges adjacent the bottom arch bar portions for reinforcing the innermost of said abutment walls.

24. A car truck side frame involving a sheet metal blank shaped to form inner and outer side walls arranged in spaced relation, each of said walls having a plurality of truck column portions, a plurality of top arch bar portions, a plurality of bottom arch bar portions, and a plurality of journal box recess portions; said journal box recess portions forming spaced abutment walls adapted to engage opposite sides of the journal boxes, and reinforcing means for certain of said abutment walls, said means including inwardly extending overlapped flanges provided on the bottom arch bar portions of the side frame.

25. A car truck side frame involving a sheet metal blank shaped to form inner and outer side walls arranged in spaced relation, each of said walls having a plurality of truck column portions, a plurality of top arch bar portions, a plurality of bottom arch bar portions, and a plurality of journal box recess portions; said journal box recess portions providing spaced abutment walls adapted to have a bearing engagement with the journal boxes, and inwardly extending flanges carried by said bottom arch bar portions, and having their inner edges overlapped and united throughout their length adjacent the innermost abutment walls for reinforcing the same.

26. A car truck side frame involving a continuous sheet metal blank shaped to form an inner wall and an outer wall arranged in spaced relation, each of said walls having a plurality of truck column portions, a plurality of top arch bar portions, and a plurality of bottom arch bar portions, said bottom arch bar portions being provided with inwardly extending stiffening flanges having portions of their inner edges overlapped and united by rivets and other portions of said flanges abutted and welded adjacent said overlapped and riveted portion, said welded portions of the flanges forming continuations of the overlapped portions of said flanges and being designed to extend entirely beneath the truck column portions of the side frame.

27. A car truck side frame involving a continuous sheet metal blank shaped to form an inner wall and an outer wall arranged in spaced relation, each of said walls having a plurality of truck column portions, a plurality of top arch bar portions, and a plurality of bottom arch bar portions; said bottom arch bar portions being provided with continuous stiffening flanges united throughout their length and projecting entirely beneath the truck column portions of the side frame.

28. A car truck side frame involving a continuous sheet metal blank shaped to form an inner wall and an outer wall arranged in spaced relation, each of said walls having a plurality of truck column portions, a plurality of top arch bar portions, and a plurality of bottom arch bar portions; said bottom arch bar portions being provided with continuous stiffening flanges united throughout portions of their length by rivets and throughout the remaining portion of their length by welding.

29. A car truck side frame involving a continuous sheet metal blank shaped to form an inner wall and an outer wall arranged in spaced relation, each of said walls having a plurality of truck column portions, a plurality of top arch bar portions, and a plurality of bottom arch bar portions; said bottom arch bar portions being provided with stiffening flanges adapted to be continuously united from points adjacent the journal boxes to points extending around and beneath the lower portions of said truck column portions.

30. A car truck side frame involving a sheet metal blank shaped to form inner and outer side walls arranged in spaced relation and provided with a bolster opening, each of said walls having a plurality of truck column portions, a plurality of top arch bar portions, and a plurality of bottom arch bar portions; said truck column portions being provided with inwardly extending stiffening flanges, portions of said flanges being overlapped and united adjacent the corner bends at the junction of the truck column portions with the spring plank seat portion adjacent the bolster opening.

31. A car truck side frame involving a sheet metal blank shaped to form inner and outer side walls arranged in spaced relation and provided with a bolster opening, each of said walls having a plurality of truck column portions, a plurality of top arch bar portions, and a plurality of bottom arch bar portions; inwardly extending stiffening flanges provided on said truck column portions, rivet means uniting portions of said flanges and adjacent weld means uniting said flanges at the junctions of the truck column portions with the spring plank seat portions adjacent the bolster opening.

32. A car truck side frame involving a sheet metal blank shaped to form inner and outer side walls arranged in spaced relation and provided with a bolster opening, each of said walls having a plurality of truck column portions, a plurality of top arch bar portions, and a plurality of bottom arch bar portions; said truck column portions being provided near their lower ends with compound curved portions adapted to be welded at the corner bends uniting said truck column portions with the spring plank seat portion adjacent the bolster opening, and means provided on said truck column portions for reinforcing said welded corner bends.

33. A car truck side frame involving a sheet metal blank shaped to form inner and outer side walls arranged in spaced relation and provided with a bolster opening, each of said walls having a plurality of truck column portions, a plurality of top arch bar portions, and a plurality of bottom arch bar portion; said truck column portions being provided near their lower ends with compound curved portions adapted to be welded at the corner bends uniting said truck column portions with the spring plank seat portion adjacent the bolster opening, and means reinforcing said welded corner bends, said means including inwardly extending flanges carried by the truck column portions and having their inner edges overlapped and riveted adjacent said welded corner bends.

34. The method of manufacturing car truck side frames which consists in forming the same from a continuous sheet metal blank having corresponding side frame portions which are symmetrically disposed with relation to an axis of symmetry passing between them, bending portions of said blank to form journal box recesses at each end of the side frame, folding the blank along a line at the top of the side frame, and uniting said portions longitudinally thereof.

35. The method of manufacturing car truck side frames which consists in forming the same from a continuous sheet metal blank having corresponding side frame portions which are symmetrically disposed with relation to an axis of symmetry passing between them, bending portions of said blank to form flanges, portions of which are adapted to be overlapped and united and other portions of which are adapted to be abutted and welded, cutting opposite ends of said blank to form journal box recesses, bending portions adjacent said recesses to form abutment walls for the journal boxes, folding the blank on a line at the top of the side frame which line throughout its length is parallel to said axis of symmetry, and finally uniting said respective flanges.

36. The method of manufacturing car truck side frames which consists in forming the same from a continuous sheet metal blank having corresponding side frame portions which are symmetrically disposed with relation to an axis of symmetry passing between them, bending portions of said blank to provide wall portions adapted to conform to the contour of portions of a journal box, bending other portions of said blank to form flanges adjacent the journal box recess wall portions, folding the blank along a line at the top of the side frame parallel to said axis of symmetry of the blank, and finally uniting said flanges.

37. The method of manufacturing car truck side frames which consists in forming the same from a continuous sheet metal blank having corresponding side frame portions which are symmetrically disposed with relation to an axis of symmetry passing between them, bending portions of said blank from one side thereof to form journal box abutment walls, cutting openings in said blank adjacent the said portions forming the abutment walls, said openings being alined longitudinally of the side frame in the same horizontal plane with the means connecting the journal boxes to the side frame, folding the blank along a line at the top of the side frame parallel to the said axis of symmetry of the blank, and uniting said portions forming the abutment walls.

38. In combination, a car truck side frame having inner and outer side walls formed with marginal flanges bent to provide a journal box bearing, and a journal box having a portion adapted to conform to and engage said box bearing, said journal box portion being inwardly restricted to provide for the use of increased metal in side frame walls adjacent the engaging journal box portion.

39. In combination, a car truck side frame having inner and outer side walls arranged in spaced relation, each of said walls being provided with flanges forming a transversely disposed journal box bearing, and a journal box having a portion engaging said box bearing, portions of said journal box being connected to said inner and outer side walls.

40. In combination, a car truck side frame having inner and outer side walls arranged in spaced relation, each of said walls being provided with portions adapted to partially embrace a journal box, and a journal box having a portion adapted to contact said portions.

41. In combination, a car truck side frame having inner and outer side walls arranged in spaced relation, each of said walls being provided with a portion shaped to form oppositely disposed journal box bearing abutments, a journal box having opposite portions contacting said abutments, and means loosely connecting the journal box to the inner and outer side walls whereby relative longitudinal thrusts between the side frame and journal box are resisted by said box bearing abutment.

42. A side frame comprising a compression portion, a tension portion, bolster guide columns spacing said portions intermediate the ends thereof, journal boxes rigidly connected adjacent the ends of said frame, the lower edge of said tension portion, beneath the bolster guide columns, being convex downwardly, said curvature changing to concave downwardly toward the ends of the frame, forming a substantially ogee curve, and continuing to join with the adjacent side walls of the journal boxes below the tops thereof.

43. A side frame comprising a compression member, a tension member, bolster guide columns spacing intermediate portions of said members leaving a window opening therebetween, journal boxes adapted for rigid connection adjacent the ends of the frame, the lower edge of that portion of the tension member, beneath the window opening, being generally straight and curved upwardly at the ends thereof beneath the bolster guide columns and extended diagonally outward, the lower edge of said member, beyond said guide columns, being curved downwardly forming a reverse curvature, and continued to meet said journal boxes below the tops thereof.

44. A side frame comprising a compression member, a tension member, bolster guide columns spacing intermediate portions of said members and leaving a window opening therebetween, the ends of said frame being formed for securely holding associated journal boxes, the lower surface of said tension member, beneath the window opening, being generally straight with the end portions thereof, beneath the bolster guide columns, extending toward the ends of the frame on a compound curve, and terminating at elevations beneath the tops of such boxes when assembled therewith.

45. A side frame comprising a compression member, a tension member, bolster guide columns spacing intermediate portions of said members leaving a window opening therebetween, that portion of the frame, adjacent the ends thereof, being formed with pockets adapted to receive journal boxes, seats for said journal boxes being provided by forming inwardly extending flanges around the edges of said pocketed portions of the frame, the lower edge of said tension member involving inwardly extending flanges, said tension member flanges being interrupted short of the journal box seat flanges to facilitate manufacture of the frame.

In testimony whereof I affix my signature.

GUSTAF A. ANDERSON.